United States Patent [19]

Bontinck et al.

[11] 3,993,718

[45] Nov. 23, 1976

[54] METHOD OF MANUFACTURING AN ARTIFICIAL PAPER

[75] Inventors: Walter Bontinck, St.Martens-Leerne; Willy De Coster, Gent, both of Belgium

[73] Assignee: U.C.B., Societe Anonyme, Belgium

[22] Filed: Jan. 6, 1975

[21] Appl. No.: 538,777

Related U.S. Application Data

[60] Continuation-in-part of Ser. No. 428,743, Dec. 12, 1973, Pat. No. 3,882,061, which is a division of Ser. No. 158,060, June 29, 1971, Pat. No. 3,876,735.

[30] Foreign Application Priority Data

July 3, 1970 Belgium .................................. 2327

[52] U.S. Cl. ................................ 264/22; 260/23 S; 260/23 H; 260/23.7 B; 260/23.7 M; 260/30.6 R; 260/31.8 M; 260/33.6 AQ; 260/33.6 PQ; 260/42.21; 260/42.24; 260/42.46; 260/889; 260/897 A; 264/80; 264/83; 264/171; 264/211; 264/234

[51] Int. Cl.² ...................... B29C 25/00; C08K 3/00

[58] Field of Search ............. 260/42.46, 23 S, 23 H, 260/23.7 B, 23.7 M, 30.6 R, 31.8 M, 33.6 AQ, 33.6 PQ, 42.21, 42.24, 889, 897 A; 264/22, 171, 211, 234

[56] References Cited
FOREIGN PATENTS OR APPLICATIONS 1,934,096   2/1970   Germany 1,240,586   7/1971   United Kingdom

*Primary Examiner*—James H. Derrington
*Attorney, Agent, or Firm*—Wenderoth, Lind & Ponack

[57] ABSTRACT

The present invention relates to a process and a composition for the manufacture of an artificial paper requiring neither calendering nor biorientation, the paper obtained having in addition to the characteristics proper to cellulose paper, improved physical properties, such as better impermeability to water vapor and air, resistance to greases and dimensional stability under various atmospheric conditions.

The paper is produced by homogenizing in a conventional rotary mixer a composition containing (a) a specific class of rigid polyolefins which provides the necessary stiffness of the paper and constitutes its framework, (b) a polymer which is incompatible with the rigid polyolefin selected from the homopolymers and copolymers containing a preponderant amount of styrene and which provides the hardness and tearability of the paper, (c) a macromolecular material producing compatibility between (a) and (b) which is a mixture prepared in advance from at least one homopolymer of ethylene, propylene or butylene, and at least one homopolymer of isobutylene, butadiene or isoprene, or butyl rubber, and (d) an inorganic filler, subjecting the thus homogenized mixture directly to extrusion to form a material which is suitable as such as a paper substitute, in the absence of further biorientation.

19 Claims, No Drawings

METHOD OF MANUFACTURING AN ARTIFICIAL PAPER

This application is a continuation-in-part of copending application Ser. No. 428,743, filed on Dec. 12, 1973, now U.S. Pat. No. 3,882,061, which in turn is a division of application Ser. No. 158,060, filed on June 29, 1971, now U.S. Pat. No. 3,876,735.

The present invention relates to a film resembling paper and to processes for the manufacture thereof.

If the properties of an ordinary cellulose paper are compared with those of any film of synthetic materials, for example of polyethylene, polypropylene, polyvinyl chloride, polystyrene and the like, it is found that the cellulose paper is characterized by lower specific strengths and elongations at break and by greater stiffness. Moreover, the tearing strength of cellulose paper is relatively poor and practically equal in both directions of the plane of the paper. Apart from these measurable properties, cellulose paper is characterized by some specific properties, namely:

1. appearance,
2. feel,
3. permanent deformation after folding,
4. absence of or a low static electricity charge,
5. ability to be written on by a pencil, pen, ballpen and the like,
6. ability to be printed on by various processes: letterpress, offset, heliogravure and the like, If it is desired to produce a synthetic film resembling celulose paper, it is therefore necessary to provide the specific properties characterizing the latter. At the same time, the synthetic materials may provide additional properties not possessed by cellulose paper, such as impermeability to water vapor and gases, resistance to greases, dimensional stability under various atmospheric conditions, and sealability.

Various means have already been adopted in attempts to imitate cellulose paper.

Some have attempted to imitate appearance alone, by surface treatment. A synthetic film may for example be treated by one of the following processes:
  a. sand blasting;
  b. passing over a rough heated roller;
  c. chemical treatment: passing the film through a bath of solvent, followed by passage through a bath containing a non-solvent for the polymer which is however miscible with the first solvent;
  d. coating the film with a highly pigmented layer;
  e. extrusion by a specific method.

By these surface treatments the opacity and the feel of paper are obtained. The base polymer in the film provides the mechanical properties. This film may or may not be oriented.

By chemical treatment with the system comprising the solvent and the non-solvent it is also possible to obtain a certain porosity, but an important advantage of plastics paper, that is to say its impermeability and resistance to liquids, is then partly lost.

One of the first attempts to make a synthetic paper consisted in producing a porous film by incorporating, during extrusion, an expansion agent which forms cavities in the film (for example expanded polystyrene). This film however is difficult to print on and it suffers both from poor impermeability and from poor resistance to liquids (spongy effect).

There are also so-called "paper-like" films, which are simple films the paper-like feel of which is obtained by a controlled melt fracture phenomenon during extrusion. These films are normally manufactured to form a film imitating tissue paper.

So-called "spun-bonded" artificial papers also exist, which are papers manufactured with synthetic fibres instead of cellulose fibres. These papers may also be subsequently coated.

Another type of artificial paper is obtained from a composition containing a high density polyethylene, an ethylene/vinyl accommodation resin, a finely divided siliceous filler and optionally a natural unmodified polystyrene. The ingredients of this composition are hot-compounded at a temperature of 120° to 160° C in a suitable blending device, the hot blended composition is rolled on a two roll mill or similar device, the rolled sheet is cut into convenient form or pelletized and the cut or pelleted material is finally extruded to form a film having the characteristics of paper.

More recently there has been proposed a process for the preparation of multicellular, multilayer thermoplastic synthetic resin films resembling paper by melt mixing and kneading a composition comprising (a) an olefin resin, (b) an additional resin selected from styrene resins, acrylate resins, acetal resins, phenoxy resins, vinyl chloride resins, vinyl acetate resins and amide resins, (c) inorganic fillers and (d) optionally a synthetic rubber, shaping the mixed and kneaded composition into a sheet and thereafter stretching the sheet biaxially at a temperature from 100° to 170° C.

Owing to the fact that these known processes require melt mixing or hot compounding of the composition and also kneading, calendering and pelletizing before extrusion, they require considerable costs of investment and energy (special equipments for hot compounding, calendering, cutting, etc. motive power and a large amount of heat energy consumption). Moreover, in the conventional processes the cost of manufacture is burdened by operations such as biaxial stretching or biorientation, which require special equipment and an elaborate technique.

An important technical and economic improvement would be made if it were possible to manufacture an artificial paper having the maximum resemblance to cellulose paper, while the cost of manufacture is reduced to a minimum. In other words, it would in particular be necessary to be able to develop an artificial paper composition permitting the direct production of the desired paper by simply mixing the components and by simple extrusion, without calendering or biorientation. The present invention relates to the solution of this problem.

The process according to the invention for the manufacture of an artificial paper requiring neither calendering nor biorientation comprises homogenizing in a conventional rotary mixer a composition containing the following;

30 to 94.8% by weight of at least one rigid polyolefin (A) selected from the group consisting of hompolymers and copolymers of ethylene, propylene, and butylene, and also mixtures thereof, and having a melt index of at most 1 decigramme per minute;

0.1 to 35% by weight of at least one polymer (B) which is incompatible with the rigid polyolefin (A) and which when extruded by itself produces a brittle film and which has a melt index lower than 10 decigrammes/minute, the polymer (B) being selected from the group consisting of homopolymers and copolymers containing a preponderant amount of styrene;

0.1 to 35% by weight of a macromolecular material (C) producing compatibility between (A) and (B), which is a mixture prepared in advance from at least one homopolymer of ethylene, propylene, or butylene and at least one homopolymer of isobutylene, butadiene, or isoprene, or butyl rubber, said material having a melt index of at most 2 dg/minute;

5 to 45% by weight of an inorganic filler (D) having a particle size lower than 50 microns;

0 to 10% by weight of adjuvants (E) selected from the group consisting of antioxidizing agents, heat stabilizers, optical bleaching agents, pigments, coloring agents, antistatic agents and lubricants, the mixture thus homogenized being subjected to extrusion in order to obtain an artificial paper, and the artificial paper thus obtained, if desired, being subjected to surface treatment.

By rigid polyolefin (A) is understood a high density polyethylene, an isotactic polypropylene, or an isotactic polybutene which has a melt index (M.I.) of at most 1 decigramme/minute, preferably lower than 0.2 decigramme per minute, measured according to the standard ASTM D 1238 - 57T. Nevertheless, the rigid polyolefin (A) may also consist of a physical mixture of these homopolymers with one another, or of copolymers obtained from ethylene, propylene, and/or butene.

In the form of a film the polyolefin (A) has a modulus of elasticity higher than 2000 kg per cm$^2$, measured according to the standard ASTM D 882 - 61T. The polyolefin (A) is used in the composition according to the invention at the rate of 30 to 94.8% by weight, preferably from 30 to 80% by weight, desirably from 40 to 80% by weight; it provides the artificial paper of the invention with rigidity and constitutes its framework.

The polymer (B), which is incompatible with the rigid polyolefin (A) and which when extruded by itself supplies a brittle, hard, fragile film, is obtained by polymerization of a preponderant amount of styrene. In the composition of the invention the polymer (B) imparts hardness and tearability to the artificial paper manufactured from this composition. Nevertheless, the properties of the polymer (B) may be modified by the conjoint presence of minor amounts of olefinic or diolefinic elastomers, derived for example from isobutylene, butadiene or isoprene, in a proportion representing at most 49% by weight of the polymer (B). Thus, polymer (B) is preferably either a mixture containing a major amount of a homopolymer of styrene and a minor amount of a homopolymer selected from polyisobutylene, polybutadiene and polyisoprene, or is a copolymer obtained by copolymerization of a major amount of styrene and a minor amount of a copolymerizable olefinic monomer selected from isobutylene, butadiene and isoprene. It is also possible to modify the polymer (B) by external plastification with conventional plasticizers for vinyl resins, such as for example dioctyl phthalate, tricresyl phosphate, in an amount from 0.1 to 30% by weight of the polymer (B). The M.I. of the polymer (B) must be lower than 10 decigrammes per minute, preferaby lower than 5. The polymer (B) is used in an amount from 0.1 to 35% by weight, preferably from 2 to 35% by weight, desirably from 5 to 30% by weight, of the total composition.

The macromolecular material (C) provides compatibility in the molten state between the polyolefin (A) and the polymer (B). It is constituted by a mixture, prepared in advance of two polymers, one of which is compatible with the polyolefin (A), i.e. polyethylene, polypropylene or polybutene, and the other is compatible with the polymer (B), i.e. polyisobutylene, polybutadiene, polyisoprene or butyl rubber (a copolymer of isobutylene containing about 0.5–2.5 mole% of isoprene). It is essential that this mixture be prepared in advance prior to its mixing with the other ingredients of the composition of the invention. Indeed, by mixing and melting together a homopolymer of propylene, ethylene or butylene on the one hand and a homopolymer of isobutylene, butadiene, or isoprene or butyl rubber on the other hand, in a suitable blending device (for example a Banbury mixer) a material is obtained which has physical and technological properties which are quite different from those of the individual polymers entering into its composition. Thus the mixture has a melt index which is lower than that of the polyolefin entering into its composition, for example a 50/50 mixture of low density polyethylene and polyisobutylene has a melt index of 0.2 dg/min. while the polyethylene present in the mixture has a melt index of about 1.5 dg./min. (the melt index decreases with increasing content of polyisobutylene). The mixture has also a lower cristallinity than the polyolefin present in its composition. Further, the sticky polyisobutylene, polybutadiene or polyisoprene part of the mixture loses its stickiness, when it is premixed with the polyolefin: the mixture obtained is a solid and non-adhesive material which may be either in the form of a powder or in the form of granules. The latter property is very important, because it enables the composition of the invention to be homogenized by a simple dry mixing in the cold of its components (A), (B), (C), (D) and (E) in a conventional rotary mixer. The solid mixture thus homogenized can then directly be extruded into an artificial paper. Such a simple method cannot be used when, for example, a sticky elastomer such as polybutadiene is substituted for the component (C) in the rotary mixer, because an agglomerate of heterogenous pellets would be obtained instead of a homogenous mixture and such pellets would block the extruder.

As examples of macromolecular materials (C) mention may be made of a 50/50 or 90/10 mixture of high or low density polyethylene and polyisobutylene, a 75/25 mixture of high or low density polyethylene and polybutadiene, a 70/30 mixture of high density polyethylene and butyl rubber, a 50/50 mixture of isotactic polypropylene and polyisobutylene, a 50/50 mixture of isotactic polypropylene and polybutadiene, a 90/10 mixture of low density polyethylene and polyisoprene and a 60/40 mixture of isotactic polypropylene and polyisoprene (all proportions being by weight). Some of the above mixtures are already commercially available such as for example the mixtures of low density polyethylene and polyisobutylene sold under the trade marks LUPOLEN 0210 H, 0230H and 0250H by BADISCHE ANILIN- & SODA-FABRIK A.G. The macromolecular material (C) contains preferably 50 to 90% by weight of the homopolymer of ethylene, propylene or butylene and 10 to 50% by weight of the homopolymer of isobutylene, butadiene or isoprene or of the butyl rubber.

Through its presence, the macromolecular material (C) makes it possible to obtain a homogeneous composition according to the invention without using calendering, the homogeneity of the composition of the invention being simply obtained in the mixer and the extruder itself. The melt index of the macromolecular material (C) must be of at most 2 decigrammes per minute, preferably lower than 1 decigramme per minute. It is used in the composition of the invention at the rate of from 0.1 to 35% by weight of the total composition, preferably from 4 to 35% by weight, desirably from 6 to 25% by weight.

The inorganic filler (D) is selected from inorganic substances which impart opacity and a suitable surface structure to the artificial paper of the invention. It may consist of talc, titanium dioxide, kaolin, zeolites, silica, zinc oxide, natural or precipitated calcium carbonate, magnesium carbonate, barytine and the like.

The particle size of the inorganic filler will as a maximum amount to 50 microns. Particle sizes higher than this are disadvantageous because of the formation of grains which are detrimental to the uniformity of the artificial paper. The amount of inorganic filler added represents from 5 to 45% by weight of the total composition of the artificial paper of the invention, preferably from 5 to 25% by weight.

The adjuvants (E) are constituted by:
a. thermal stabilizers, such as diphenylthiourea, alpha-phenyl-indol, barium, cadmium or zinc palmitate or stearate, tris-nonylphenyl phosphite or the like;
b. antioxidizing agents such as 4,4'-thio-bis(6-t-butyl-metacresol), 4,4'-methylene-bis(2,6-di-t-butyl-phenol), butylated hydroxytoluenes or the like;
c. optical bleaching agents, such as sulfonated derivatives of stilbene;
d. organic coloring agents such as the phthalocyanines, disazoic coloring agents, chlorinated indanthrenes or the like;
e. inorganic pigments such as zinc chromate, cadmium sulfide, iron oxide or the like;
f. lubricants such as magnesium and calcium stearate, paraffin oil or the like;
g. antistatic agents, such as $C_{12}$–$C_{18}$ alkylamines and N,N'-bis(2-hydroxyethyl)-$C_{12}$–$C_{18}$ alkylamines.

The components (A), (B), (C), (D) and (E) are mixed together in a mixer of conventional construction, preferably in an ordinary rotary mixer. The composition of the invention therefore makes it possible to eliminate calendering and subsequent granulation before extrusion, which constitutes a considerable saving in manufacturing costs.

A suitable way of preparing this mixture consists in addiing components (A), (B), and (C), together with a liquid lubricant (for example paraffin oil) into the rotary mixer and then adding to the resulting mixture the components (D) and (E), which are in the form of a powder. This technique is not necessary if the components (D) and (E) are added in the form of a master batch. As a rule the length of the operation of mixing in the rotary mixer amounts at most to 60 minutes and is preferably from 10 to 45 minutes, at ambient temperature.

The homogeneous mixture thus obtained is subjected to extrusion in an apparatus of conventional design, in which the mixture is brought to a temperature of at most 290° C. The extrusion temperature may vary between 100° C and 290° C in dependence on the composition of the mixture. Moreover, while remaining within the temperature limits specified above, temperature gradients may exist from the supply zone of the extruder to the end zone of the extrusion die.

The extruder may contain one or more extrusion screws; it is merely important, in each case, that the composition obtained should be perfectly homogeneous at the outlet of the die.

The die should in turn be constructed so that the extruded film has a regular final calibre.

The properties of the artificial paper obtained at the outlet of the die are such that subsequent biorientation is unnecessary, which provides a second considerable saving in the manufacturing process according to the invention.

The artificial paper according to the invention may then undergo surface treatment to improve subsequent printability. This treatment, which is well known in the field of plastics, may consist in subjecting the paper to the action of a flame, corona effect, oxidizing chemical agents and the like.

If desired, the surface treatment of the paper as described above may be preceded by an operation of embossing its surface, in which the film passes between heated profiled rollers, thus making it possible to impart to the film a grainy appearance, a linen paper appearance, or any other appearance desired.

The invention is illustrated by the following non-limitative examples.

EXAMPLE 1

The following ingredients are mixed in the indicated proportions in a rotary mixer:

50% by weight of a high density polyethylene having a density of 0.96 and a melt index of 1 dg/min. (component A)

15% by weight of a mixture of the impact polystyrene type containing 90% polystyrene and 10% polybutadiene, with a melt index of 3 dg/min. under a pressure of 100 psi (7 kg/cm$^2$) component B)

20% by weight of a mixture prepared in advance of 50% polyethylene ($d$ = 0.92; M.I. = 1.5 dg/min.) and 50% polyisobutylene, the mixture having a melt index of 0.2 dg./min. (component C)

10% by weight of titanium dioxide passing through a 50 micron screen (component D)

4% by weight of precipitated calcium carbonate passing through a 50 micron screen (component D) and 1% by weight of paraffin oil (component E).

The components (A), (B), and (C) are wetted with the compound (E) before incorporating the fillers (D), and the ingredients are mixed for 35 minutes at ambient temperature. The mixture obtained in this manner is then passed into a laboratory extruder of the type L = 20 D through a round die, at a temperature of 235° C.; the bubble is blown to three times the dimension of the die. After passing between pressing rollers the film is wound up. The film is then subjected to corona treatment on one face. The final paper obtained in this manner has the appearance of glazed cellulose paper on which it is possible to write with a pencil, pen, or ballpen.

The properties of the artificial paper obtained in this example are shown in the following table:

Table I

| | | | |
|---|---|---|---|
| Thickness of paper | | microns | 150 |
| Density of paper | | | 1 |
| Tensile strength at break | M/D | kg/cm² | 190 |
| (ASTM D 882-61T) | T/D | | 115 |
| Elongation at break | M/D | % | 13 |
| (ASTM D 882-61T) | T/D | | 11 |
| Apparent elastic limit | M/D | kg/cm² | nil |
| (ASTM D 882-61T) | T/D | | |
| Modulus of elasticity | M/D | kg/cm² | 7,600 |
| (at a strain rate of | | | |
| 10 mm/min.) | T/D | | 7,400 |
| Tear strength | M/D | g/sheet | 67 |
| (ASTM D 1922-61T) | T/D | | 74 |
| Burst strength | | kg | 1.85 |
| (Mullens Burst test, | | | |
| ASTM D 774-67) | | sag mm | 3.7 |
| Impact strength | | | |
| (ASTM D 1709-67) | | g | 50 to 90 |
| Stiffness | M/D | mg/sheet | 87 |
| (ASTM D 747-63) | T/D | | 113 |
| Coefficient of friction | | static | 0.5 |
| film on film (ASTM D 1894-63) | | dynamic | 0.3 |
| Water vapor transmission | | g/m² (24h) | 2 |
| rate (ASTM E 96/E-66) | | | |
| Air permeability (*) | | ml/m² (24h) | 90 |
| (ASTM D 1434-58) | | | |
| Dimensional variations in % | M/D | 75° C | + 0.04 |
| at the temperature of | T/D | | + 0.17 |
| | M/D | 100° C | − 1.23 |
| | T/D | | −0.16 |
| Softening temperature | Start | °C | 121° |
| | Total | | 133° |
| Dimensional variations in | M/D | | nil |
| % in 24h in water at 20° C | T/D | | nil |

M/D = machine direction
T/D = transverse direction
(*) milliliters of air passing per 24 hours through a 1 m² film, with a pressure difference of 1 atmosphere between the faces of the film.

In this table the properties of tearability, impact resistance, stiffness, water vapor transmission rate and air permeability are properties which depend on the thickness of the paper, while the tensile strength at break, elongation at break, and modulus of elasticity are properties independent of the thickness of the paper.

This table shows that the artificial paper according to the invention possesses mechanical properties similar to those of a cellulose paper and that in this regard it is very different from an ordinary film of plastics material. In addition, foldability and tearability are likewise of the same kind as those of glazed paper. Nevertheless, the paper of the invention has the advantage over cellulose paper of possessing better impermeability to water vapor and air and of having remarkable dimensional stability under variable climatic conditions. Moreover, unlike ordinary paper, it withstands water perfectly.

EXAMPLE 2.

The following ingredients are mixed in the indicated proportions in an ordinary rotary mixer:
 35% by weight of a high density polyethylene having a density of 0.96 and a melt index of 0.4 dg./min. (component A)
 14% by weight of a 90/10 styrene-butadiene copolymer having a melt index of 3.5 dg./min. under a pressure of 100 psi (7 kg/cm²) (component B)
 20% by weight of a 50/50 ethylene-isobutylene copolymer having a melt index of 0.2 dg./min. (component C)
 20% by weight of a master batch consisting of a 60/40 mixture of titanium dioxide and of high density polyethylene having a melt index of 8 dg./min. (components D and A)
 10% by weight of a master batch consisting of a 50/50 mixture of calcium carbonate and of high density polyethylene ($d = 0.96$) having a melt index of 4 dg./min. (components D and A) and
 1% by weight of antistatic agent (component E) consisting of a mixture of $C_{12}$–$C_{18}$ alkylamines.

Mixing is carried out at ambient temperature for a period of 25 minutes. The homogenized mixture obtained in this manner is extruded in the same extruder and under the same conditions of operation as in Example 1.

The artificial paper obtained in this manner possesses characteristics similar to those of the paper prepared in Example 1.

EXAMPLE 3.

The following ingredients are mixed in the indicated proportions in a rotary mixer:
 12% by weight of isotactic polypropylene having a melt index of 1 dg./min. and
 39% by weight of high density polyethylene having a density of 0.96 and a melt index of 1 dg./min. (component A),
 10% by weight of a 80/20 mixture of polystyrene and polybutadiene having a melt index of 4 dg./min. under a pressure of 300 psi (21 kg/cm²) (component B),
 23% by weight of a mixture prepared in advance of 70% high density polyethylene ($d = 0.96$; M.I. = 5 dg./min.) and 30% butyl rubber, with a melt index of 2 dg./min. (component C),
 10% by weight of a master batch consisting of a 50/50 mixture of titanium dioxide and high density polyethylene ($d = 0.96$) with a melt index of 5 dg./min. (components D + A),
 5% by weight of precipitated calcium carbonate (component D),
 0.9% by weight of paraffin oil (component E), and 0.1% by weight of optical bleaching agent (component E).

Mixing is carried out at ordinary temperature for a period of 35 minutes. The homogenized mixture obtained in this manner is extruded in the same extruder and under the same conditions of operation as in Example 1.

The properties of the artificial paper obtained are similar to those of the paper prepared in Example 1.

EXAMPLE 4

The following ingredients are mixed in the indicated proportions in a rotary mixer at ambient temperature:

66% by weight of a high density polyethylene having a melt index of 0.3 dg./min. and a density of 0.96 (component A)

2% by weight of a 66/34 styrene-butadiene copolymer having a density of 0.94 and a melt index of 3.2 dg./min. (component B)

4% by weight of a mixture prepared in advance of 50% isotactic polypropylene ($d = 0.910$; M.I. = 1 dg./min.) and 50% polyisobutylene ($d = 0.93$), the mixture having a melt index of 0.2 dg./min. (component C).

7% by weight of a master batch consisting of a 50/50 mixture of titanium dioxide and high density polyethylene ($d = 0.96$; M.I. = 0.3 dg./min.) (components D and A)

20% by weight of a master batch consisting of a 50/50 mixture of calcium carbonate and high density polyethylene ($d = 0.96$; M.I. = 0.3 dg./min.) (components D and A)

0.4% by weight of antistatic agent consisting of N,N'-bis(2-hydroxyethyl)-$C_{12}$–$C_{18}$ alkylamines (component E), and 0.6% by weight of lubricant consisting of hydroxystearic acid (component E).

The homogenized mixture obtained is extruded in the same extruder and under the same conditions of operation as in Example 1.

The properties of the artificial paper obtained in this example are shown in the following table:

Table II

| | | | |
|---|---|---|---|
| Thickness of paper | | microns | 75 |
| Tensile strength at break | M/D | kg/cm$^2$ | 121 |
| (ASTM D 882-61T) | T/D | | 131 |
| Elongation at break | M/D | % | 192 |
| (ASTM D 882-61T) | T/D | | 16 |
| Modulus of elasticity | M/D | kg/cm$^2$ | 5,200 |
| (at a strain rate of 10 mm/min.) | T/D | | 5,200 |
| Impact strength | | g | 90 to 150 |
| (ASTM D 1709-67) | | | |
| Coefficient of friction | | static | 0.6 |
| film on film (ASTM D 1894-63) | | dynamic | 0.4 |
| Water vapor transmission rate | | g/m$^2$ (24h) | <5 |
| (ASTM E 96/E-66) | | | |
| Air permeability (*) | | ml/m$^2$ (24h) | <100 |
| (ASTM D 1434-58) | | | |

M/D = machine direction
T/D = transverse direction
(*) milliliters of air passing per 24 hours through a 1 m$^2$ film, with a pressure difference of 1 atmosphere between the faces of the film.

The artificial paper obtained in this manner possesses characteristics similar to those of the paper prepared in Example 1; it is however less stiff than the paper produced in Example 1.

EXAMPLE 5.

The following ingredients are mixed in the indicated proportions in a rotary mixer at ambient temperature:

41.7% by weight of a high density polyethylene having a melt index of 0.3 dg./min. and a density of 0.96 (component A)

10% by weight of a 66/34 styrene-butadiene copolymer having a density of 0.94 and a melt index of 3.2 dg./min. (component B)

35% by weight of a mixture prepared in advance of 75% low density polyethylene ($d = 0.920$; M.I. = 3 dg./min.) and 25% polybutadiene ($d = 0.92$), the mixture having a melt index of 1.5 dg./min. (component C)

7% by weight of titanium dioxide (component D)

6% by weight of magnesium carbonate (component D) and 0.3% by weight of antistatic agent (component E) consisting of a mixture of $C_{12}$–$C_{18}$ alkylamines.

The homogenized mixture obtained is extruded in the same extruder and under the same conditions of operation as in Example 1.

The properties of the artificial paper obtained in this example are shown in the following table:

Table III

| | | | |
|---|---|---|---|
| Thickness of paper | | microns | 100 |
| Tensile strength at break | M/D | kg/cm$^2$ | 133 |
| (ASTM D 882-61T) | T/D | | 93 |
| Elongation at break | M/D | % | 14 |
| (ASTM D 882-61T) | T/D | | 8 |
| Modulus of elasticity | M/D | kg/cm$^2$ | 6,800 |
| (at a strain rate of 10 mm/min.) | T/D | | 6,300 |
| Impact strength | | g | <100 |
| (ASTM D 1709-67) | | | |
| Coefficient of friction | | static | 0.5 |
| film on film (ASTM D 1894-63) | | dynamic | 0.3 |
| Water vapor transmission rate | | g/m$^2$ (24h) | <5 |
| (ASTM E 96/E-66) | | | |
| Air permeabiity (*) | | ml/m$^2$ (24h) | <100 |

Table III-continued (ASTM D 1434-58)

M/D = machine direction
T/D = transverse direction
(*) milliliters of air passing per 24 hours through a 1 m² film, with a pressure difference of 1 atmosphere between the faces of the film.

The properties of the artificial paper obtained are similar to those of the paper produced in Example 1; it is as foldable and as tearable as the latter and has the same filler content.

EXAMPLE 6.

The following ingredients are mixed in the indicated proportions in a rotary mixer at ambient temperature:
  37% by weight of a high density polyethylene having a melt index of 0.3 dg./min. and a density of 0.96 (component A)
  25% by weight of a 90/10 styrene-butadiene copolymer having a melt index of 3.5 dg./min. under a pressure of 100 psi (7 kg./cm²) (component B)
  30% by weight of a mixture prepared in advance of 90% low density polyethylene ($d = 0.920$; M.I. = 1.5 dg./min.) and 10% polyisobutylene, the mixture having a melt index of 1 dg./min. (component C) and
  8% by weight of calcium carbonate (component D).

The homogenized mixture obtained is extruded in the same extruder and under the same conditions of operation as in Example 1.

The properties of the artificial paper obtained in this example are shown in the following table:

Table IV

| | | | |
|---|---|---|---|
| Thickness of paper | | microns | 100 |
| Tensile strength at break | M/D | kg/cm² | 204 |
| (ASTM D 882-61T) | T/D | | 69 |
| Elongation at break | M/D | % | 8 |
| (ASTM D 882-61T) | T/D | | 3 |
| Modulus of elasticity | M/D | kg/cm² | 10,400 |
| (at a strain rate of 10 mm/min.) | T/D | | 8,100 |
| Tear strength | highly tearable | | |
| Impact strength | | g | <100 |
| (ASTM D 1709-67) | | | |
| Coefficient of friction | | static | 0.5 |
| film on film (ASTM D 1894-63) | | dynamic | 0.3 |
| Water vapor transmission rate | | g/m² (24h) | <5 |
| (ASTM E 96/E-66) | | | |
| Air permeability (*) | | ml/m² (24h) | <100 |
| (ASTM D 1434-58) | | | |

M/D = machine direction
T/D = transverse direction
(*) milliliters of air passing per 24 hours through a 1 m² film, with a pressure difference of 1 atmosphere between the faces of the film.

The artificial paper obtained in this manner possesses characteristics similar to those of the paper of Example 1, but the paper is very easily torn and has the translucent aspect of tracing paper.

EXAMPLE 7.

The following ingredients are mixed in the indicated proportions in a rotary mixer at ambient temperature:
  61% by weight of a 95/5 ethylene-propylene copolymer having a density of 0.95 and a melt index of 0.3 dg./min. (component A)
  8% by weight of a 70/30 mixture of polystyrene and polyisobutylene, the mixture having a melt index of 2.8 dg./min. (component B)
  10% by weight of a mixture prepared in advance of 50% isotactic polypropylene ($d = 0.910$; M.I. = 1 dg./min.) and 50% polybutadiene, the mixture having a melt index of 0.2 dg./min. (component C)
  20% by weight of a master batch consisting of a 50/50 mixture of calcium carbonate and of high density polyethylene ($d = 0.96$; M.I. = 0.3 dg./min.) (components D and A) and
  1% by weight of paraffin oil (component E).

The homogenized mixture obtained is extruded in the same extruder and under the same conditions of operation as in Example 1.

The properties of the artificial paper obtained in this example are shown in the following table:

Table V

| | | | |
|---|---|---|---|
| Thickness of paper | | microns | 90 |
| Tensile strength at break | M/D | kg/cm² | 138 |
| (ASTM D 882-61T) | T/D | | 119 |
| Elongation at break | M/D | % | 594 |
| (ASTM D 882-61T) | T/D | | 30 |
| Modulus of elasticity | M/D | kg/cm² | 7,800 |
| (at a strain rate of 10 mm/min.) | | | |
| Tear strength | less tearable | | |
| Impact strength | | g | 90 to 150 |
| (ASTM D 1709-67) | | | |
| Coefficient of friction | | static | 0.6 |
| film on film (ASTM D 1894-63) | | dynamic | 0.3 |
| Water vapor transmission rate | | g/m² (24h) | <5 |
| (ASTM E 96/E-66) | | | |
| Air permeability (*) | | g/m² (24h) | <100 |

Table V-continued (ASTM D 1434-58)

M/D = machine direction
T/D = transverse direction
(*) milliliters of air passing per 24 hours through a 1 m² film, with a pressure difference of 1 atmosphere between the faces of the film.

The properties of the artificial paper obtained are similar to those of the paper prepared in Example 6, but the paper is less tearable (it is even less tearable than the paper produced in Example 1).

EXAMPLE 8.

The following ingredients are mixed in the indicated proportions in a rotary mixer at ambient temperature:
- 30% by weight of a high density polyethylene having a density of 0.96 and a melt index of 0.4 dg./min. (component A)
- 10% by weight of a 70/30 mixture of polystyrene and polyisoprene, the mixture having a melt index of 2.8 dg./min. (component B)
- 13.5% by weight of a mixture prepared in advance of 90% low density polyethylene ($d = 0.920$; M.I. $= 3$ dg./min.) and 10% isotactic polyisoprene, the mixture having a melt index of 2 dg./min. (component C)
- 5% by weight of kaolin (component D)
- 20% by weight of titanium dioxide (component D)
- 20% by weight of calcium carbonate (component D)
- 0.3% by weight of antioxidizing agent consisting of 4,4'-thio(6-t-butyl-metacresol) (component E)
- 0.4% by weight of antistatic agent consisting of a mixture of $C_{12}$–$C_{18}$ alkylamines (component E) and
- 0.8% by weight of lubricant consisting of hydroxystearic acid (component E).

The homogenized mixture obtained is extruded in the same extruder and under the same conditions of operation as in Example 1.

The properties of the artificial paper obtained in this example are shown in the following table:

The artificial paper obtained in this manner possesses characteristics similar to those of the paper prepared in Example 1; it is however less stiff than the paper produced in the latter Example and has moreover a very high filler content.

EXAMPLE 9.

The following ingredients are mixed in the indicated proportions in a rotary mixer at ambient temperature:
- 49.5% by weight of a high density polyethylene having a density of 0.96 and a melt index of 1 dg./min. (component A)
- 10% by weight of a 66/34 styrene-butadiene copolymer having a density of 0.94 and a melt index of 3.2 dg./min. (component B)
- 15% by weight of a mixture prepared in advance of 60% polypropylene ($d = 0.910$; M.I. $= 1$ dg./min.) and 40% polyisoprene, the mixture having a melt index of 0.3 dg./min. (component C)
- 15% by weight of a master batch consisting of a 60/40 mixture of titanium dioxide and of high density polyethylene having a melt index of 8 dg./min. (components D and A)
- 10% by weight of a master batch consisting of a 50/50 mixture of calcium carbonate and of high density polyethylene ($d = 0.96$; M.I. $= 0.3$ dg./min.) (components D and A) and
- 0.5% by weight of antistatic agent (component E) consisting of a mixture of $C_{12}$–$C_{18}$ alkylamines.

The homogenized mixture obtained is extruded in the same extruder and under the same conditions of operation as in Example 1.

The properties of the artificial paper obtained in this

Table VI

| | | | |
|---|---|---|---|
| Thickness of paper | | microns | 85 |
| Tensile strength at break | M/D | kg/cm² | 98 |
| (ASTM D 882-61T) | T/D | | 78 |
| Elongation at break | M/D | % | 212 |
| (ASTM D 882-61T) | T/D | | 20 |
| Modulus of elasticity | M/D | kg/cm² | 3,100 |
| (at a strain rate of | | | |
| 10 mm/min.) | T/D | | 4,400 |
| Coefficient of friction | | static | 0.6 |
| film on film (ASTM D 1894-63) | | dynamic | 0.5 |
| Water vapor transmission rate | | g/m² (24h) | <5 |
| (ASTM E 96/E-66) | | | |
| Air permeability (*) | | ml/m² (24h) | <100 |
| (ASTM D 1434-58) | | | |

M/D = machine direction
T/D = transverse direction
(*) milliliters of air passing per 24 hours through a 1 m² film, with a pressure difference of 1 atmosphere between the faces of the film.

example are shown in the following table:

Table VII

| | | | |
|---|---|---|---|
| Thickness of paper | | microns | 155 |
| Tensile strength at break | M/D | kg/cm² | 156 |
| (ASTM D 882-61T) | T/D | | 108 |
| Elongation at break | M/D | % | 10 |
| (ASTM D 882-61T) | T/D | | 7 |
| Modulus of elasticity | M/D | kg/cm² | 6,700 |
| (at a strain rate of | | | |
| 10 mm/min.) | T/D | | 7,200 |
| Impact strength | | g | 90 to 150 |
| (ASTM D 1709-67) | | | |
| Coefficient of friction | | Static | 0.6 |

Table VII-continued

| | | |
|---|---|---|
| film on film (ASTM D 1894-63) | dynamic | 0.3 |
| Water vapor transmission rate (ASTM E 96/E-66) | g/m² (24h) | <5 |
| Air permeability (*) (ASTM D 1434-58) | ml/m² (24h) | <100 |

M/D = machine direction
T/D = transverse direction
(*) milliliters of air passing per 24 hours through a 1 m² film, with a pressure difference of 1 atmosphere between the faces of the film.

The properties of the artificial paper obtained are similar to those of the paper produced in Example 1, but the paper is more tearable than the latter, although it is less tearable than the paper of Example 6.

The artificial paper of the invention can be printed in particular by the following processes; offset, lithography, letterpress, (helio) gravure, flexography, silk-screen, it can be impulse or heat sealed, it can be stuck on ordinary paper with glues normally suitable for polyethylene, it can be laminated on different types of film, on cellophane and the like, with the aid of common glues, it is thermoformable, so that embossing can be carried out and any desired surface structures obtained by simply passing over heated rollers.

The artificial paper manufactured according to the present invention can be used for making maps of any kind: tourist maps, topographical maps, road maps, and the like, for printing instructions on official documents (driving licences, hunting permits, fishing permits), for forms, catalogues, and the like.

The synthetic paper according to the invention can also be used for any artistic printing application and for posters displayed outdoors.

It can also be used for printing children's books because the pages are washable with water. As the synthetic paper of the invention does not form dust, it is recommended for special applications in certain industries (for example the manufacture of transistors) where the presence of dust is not allowable.

The artificial paper of the invention is very particularly recommended for use in places where oil or grease is found, for example as manuals for the greasing of cars, machines, and the like, as selfadhesive labels resisting oils and greases.

We claim:
1. A process for the manufacture of artificial paper requiring neither calendering nor biorientation, which comprises homogenizing in a conventional rotary mixer a composition containing:
   30 to 94.8% by weight of at least one rigid polyolefin (A) selected from the group consisting of homopolymers and copolymers of ethylene, propylene, and butylene, and also mixtures thereof, and having a melt index of at most 1 dg./min.
   0.1 to 35% by weight of at least one polymer (B) which is incompatible with the rigid polyolefin (A and which when extruded by itself produces a brittle film and which has a melt index lower than 10 dg./min., the polymer (B) being selected from the group consisting of homopolymers and copolymers containing a preponderant amount of styrene;
   0.1 to 35% by weight of a macromolecular material (C) producing compatibility between (A and (B) which is a mixture prepared in advance by melting and mixing together at least one homopolymer of ethylene, propylene or butylene, and at least one homopolymer of isobutylene, butadiene or isoprene, or butyl rubber, said material (C) having a melt index of at most 2 dg./min.;
   5 to 45% by weight of an inorganic filler (D) having a particle size lower than 50 microns;
   0 to 10% by weight of adjuvants (E) selected from the group consisting of antioxidizing agents, thermal stabilizers, optical bleaching agents, pigments, coloring materials, antistatic agents, and lubricants; the mixture thus homogenized being subjected to extrusion to obtain an artificial paper, and the artificial paper thus obtained, if desired, being subjected to surface treatment.

2. A process according to claim 1, in which the polyolefin (A) is selected from the group consisting of high density polyethylene and isotactic polypropylene.

3. A process according to claim 1, in which the polyolefin (A is a physical mixture of high density polyethylene and isotactic polypropylene.

4. A process according to claim 1, in which the polyolefin (A) is a copolymer of ethylene and propylene.

5. A process according to claim 1, in which the polymer (B) is a mixture containing a major amount of a homopolymer of styrene and a minor amount of a homopolymer obtained by polymerization of an olefinic compound selected from the group consisting of isobutylene, butadiene and isoprene.

6. A process according to claim 1, in which the polymer (B) is a copolymer obtained by copolymerization of a major amount of styrene and a minor amount of a polymerizable olefinic monomer selected from the group consisting of isobutylene, butadiene and isoprene.

7. A process according to claim 1, in which the polymer (B) is plasticized with 0.1 to 30% by weight of a plasticizer.

8. A process according to claim 1, in which the macromolecular material (C) is selected from the group consisting of a 50/50 mixture of high or low density polyethylene and polyisobutylene, a 90/10 mixture of high or low density polyethylene and polyisobutylene, a 75/25 mixture of high or low density polyethylene and polybutadiene, a 50/50 mixture of isotactic polypropylene and polybutadiene, a 70/30 mixture of high density polyethylene and butyl rubber, a 50/50 mixture of isotactic polypropylene and polyisobutylene, a 90/10 mixture of low density polyethylene and polyisoprene and a 60/40 mixture of isotactic propylene and polyisoprene.

9. A process according to claim 1, in which the composition used contains 40 to 80% of polyolefin (A).

10. A process according to claim 1, in which the composition used contains 5 to 30% by weight of polymer (B).

11. A process according to claim 1, in which the composition used contains 6 to 25% of macromolecular material (C).

12. A process according to claim 1, in which macromolecular material (C) contains 50 to 90% by weight of homopolymer of ethylene, propylene or butylene, and 10 to 50% by weight of homopolymer of isobutylene, butadiene or isoprene or of butyl rubber.

13. A process according to claim 1, in which the inorganic filler (D) is selected from the group consisting of talc, titanium dioxide, kaolin, zeolites, silica, zinc oxide, natural or precipitated calcium carbonate, magnesium carbonate and barytine.

14. A process according to claim 1, in which the antioxidizing agent used as adjuvant (E) is selected from the group consisting of 4,4'-thio-bis(6-t-butyl-metacresol, 4,4'-methylene-bis(2,6-di-t-butylphenol) and butylated hydroxytoluenes.

15. A process according to claim 1, in which the optical bleaching agent used as adjuvant (E) is selected from the class of sulfonated derivatives of stilbene.

16. A process according to claim 1, in which the lubricant used as adjuvant (E) is selected from the group consisting of magnesium stearate, calcium stearate, and paraffin oil.

17. A process according to claim 1, in which the mixing of the composition in the rotary mixer is carried out at ambient temperature.

18. A process according to claim 1, in which the extrusion is carried out at a temperature between 100° and 290° C.

19. A process according to claim 1, in which the artificial paper is further subjected to a surface treatment by corona effect.

* * * * *